United States Patent
Frantz et al.

(10) Patent No.: US 6,904,495 B2
(45) Date of Patent: Jun. 7, 2005

(54) METHOD FOR IDENTIFYING THE WRITE PROTECT STATUS OF A DISKETTE

(75) Inventors: Christopher J. Frantz, Houston, TX (US); E. David Neufeld, Magnolia, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 239 days.

(21) Appl. No.: 10/043,478

(22) Filed: Jan. 10, 2002

(65) Prior Publication Data

US 2003/0131189 A1 Jul. 10, 2003

(51) Int. Cl.[7] .............................................. G06F 12/00
(52) U.S. Cl. ......................... 711/111; 711/156; 714/48; 360/60
(58) Field of Search ............................. 711/4, 111, 154, 711/156, 163, 165; 714/48, 799; 360/60; 369/53.24, 53.35, 53.36

(56) References Cited

U.S. PATENT DOCUMENTS

| | | | | |
|---|---|---|---|---|
| 5,610,893 A | * | 3/1997 | Soga et al. | 369/53.24 |
| 5,790,895 A | | 8/1998 | Krontz et al. | 395/884 |
| 5,898,861 A | | 4/1999 | Emerson et al. | 395/500 |
| 6,104,561 A | * | 8/2000 | Braithwaite et al. | 360/60 |
| 6,317,281 B1 | * | 11/2001 | Ogawa et al. | 360/60 |
| 6,330,648 B1 | * | 12/2001 | Wambach et al. | 711/163 |
| 6,598,135 B1 | * | 7/2003 | MacLeod | 711/163 |

OTHER PUBLICATIONS

Emerson et al., "Operating System Independent Method and Apparatus for Graphical Remote Access," U.S. Appl. No. 09/438,253, filed Nov. 12, 1999.
Frantz et al., "USB Virtual Devices," U.S. Appl. No.: 09/544,573, filed Apr. 6, 2000, now U.S. Patent 6,636,929.
Emerson et al., "Video Eavesdropping and Reverse Assembly to Transmit Video Action to a Remote Console," U.S. Appl. No.: 08/733,254, filed Oct. 18, 1996, now U.S. Patent 6,476,854.
"Compaq Remote System Management for Industry–Standard Servers," Compaq Computer Corporation Technology Brief, Sep. 2001.
"Remote Server Management with Integrated Remote Console," Compaq Computer Corporation Technology Brief, Oct. 21, 1996.

* cited by examiner

Primary Examiner—Pierre M. Vital

(57) ABSTRACT

A technique is provided for identifying the write protect status of a removable storage media, such as a computer diskette, prior to normal interaction with the media. The present technique interacts with the removable storage media and identifies the write protect status as write protected if the interaction produces a failure code indicative of write protection. For example, data storage may be attempted at a non-storage location, thereby producing a write protect error if the media is write protected or an invalid write error if the media is not write protected. Alternatively, the present technique may attempt to read and rewrite data back to the media, thereby producing the write protect error if the media is write protected.

15 Claims, 3 Drawing Sheets

METHOD FOR IDENTIFYING THE WRITE PROTECT STATUS OF A DISKETTE

BACKGROUND OF THE INVENTION

1. Field of the Invention

The present technique relates generally to removable storage media, such as computer diskettes, which comprise a write protect mechanism. More particularly, the present technique provides a method for identifying the write protect status of the removable storage media prior to accessing the media and automatically upon inserting the media into a media drive.

2. Background of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Removable storage media, such as computer diskettes, often have write protect mechanisms to control data storage to the media. For example, 3-½ inch floppy diskettes have a write protect mechanism comprising an aperture and a slider that is movable over the aperture. If the slider covers the aperture, such that the aperture is closed, then data can be written to the floppy diskette. However, if the slider is moved away from the aperture, then the floppy diskette is write protected. In certain applications, it is desirable to know the write protect status of the removable storage media prior to accessing the media or attempting storage to the media. Unfortunately, the write protect status of the removable storage media is typically determined by physically observing the write protect mechanism or by attempting to store data to the media during normal storage operations.

Accordingly, a technique is needed for identifying the write protect status of the removable storage media, such as a computer diskettes, prior to accessing the media or attempting storage to the media. It also would be advantageous to identify the write protect status of the removable storage media automatically upon insertion into a media drive.

BRIEF DESCRIPTION OF THE DRAWINGS

Certain advantages of the invention may become apparent upon reading the following detailed description and upon reference to the drawings in which.

DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
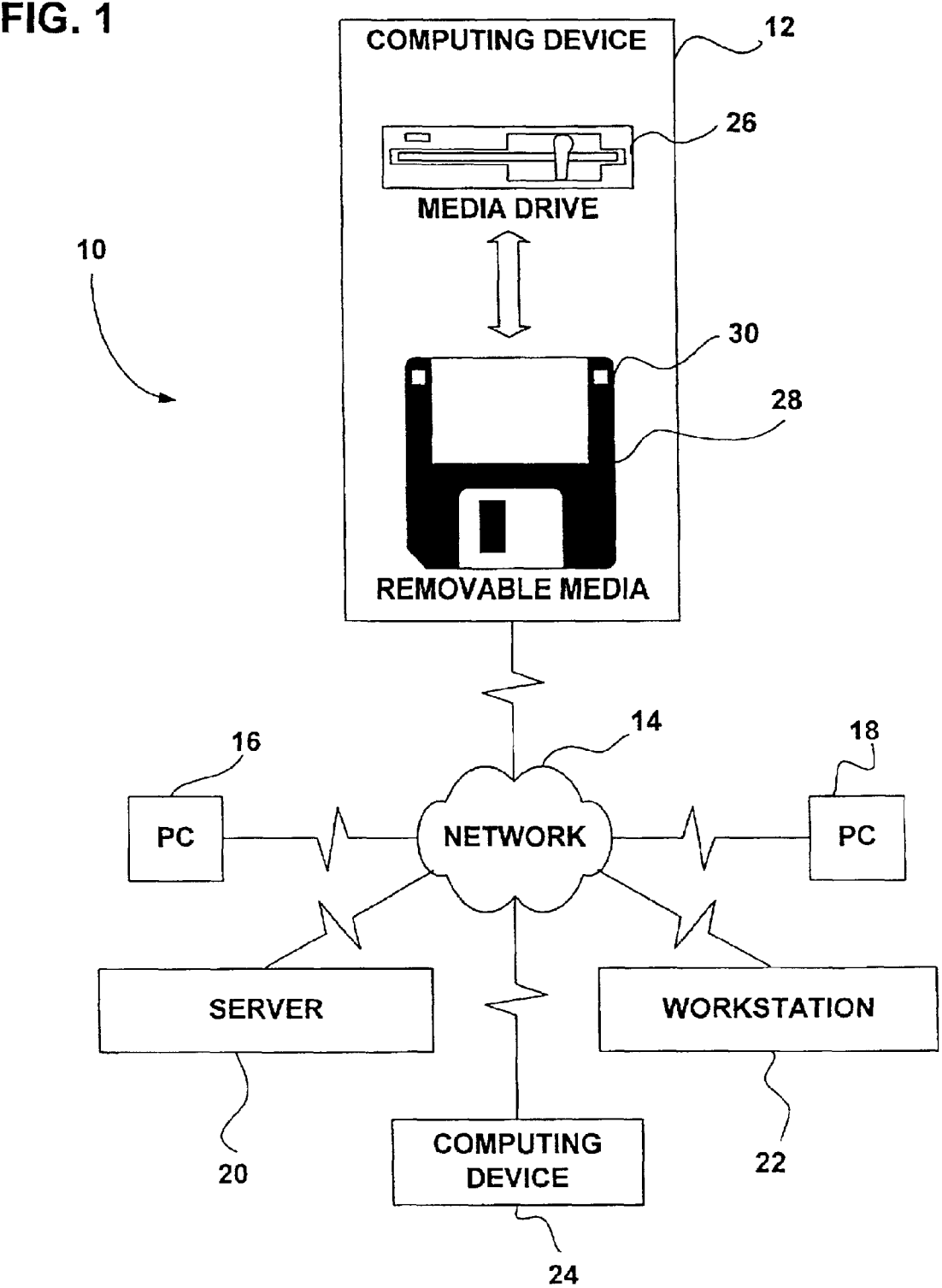
FIG. 1 is a block diagram illustrating an exemplary system of the present technique.

Turning now to the drawings and referring initially to FIG. 1, a block diagram of an exemplary system in which the present invention may be practiced is illustrated and designated using a reference numeral 10. As illustrated, the system comprises a computing device 12 communicatively coupled to a plurality of remote devices via a network 14. For example, the computing device 12 may communicate through the network 14 with personal computers 16 and 18, a server 20 (e.g., a headless server), a workstation 22, and a computing device 24. The computing devices 12 and 24 may embody any desired stationary or mobile computing device, such as a desktop computer, a laptop computer, a personal digital assistant, a workstation, a server, or any other processor-based device. Accordingly, the computing devices 12 and 24 may comprise a variety of software and hardware, such as an operating system, application programs, circuitry, a processor, random access memory, read only memory, a hard disk drive, CD/DVD drives, a floppy disk drive, audio/video devices (e.g., a monitor), input/output devices (e.g., a keyboard, a mouse, etc.), and various other components.

In this exemplary embodiment, the computing device 12 comprises a media drive 26 for a removable media 28, which may embody a variety of storage media such as a computer diskette (e.g., a floppy diskette). The removable media 28 also has a write protect mechanism 30 for protecting data on the media 28. For example, the write protect mechanism 30 may comprise a slider mechanism that is movable between open and closed positions over an aperture. As described in detail below, the present technique identifies the write protect status of the write protect mechanism 30 prior to accessing the media or attempting storage to the media during normal operations.

The write protect status of the write protect mechanism 30 may be desired by the computing device 12 or any of the remote devices 16 through 24. For example, the headless server 20 may desire interaction with the removable media 28 for software/hardware configuration of the server 20. Moreover, any of the remote devices 16 through 24 may interact with the removable media 28 to access data, to access program files, to access a desired operating system, or to perform any desired operation disposed on the media 28. For example, one computer may interact with another computer to perform remote management functions, which may require interaction with the removable media 28. Accordingly, the following write protect identification techniques are intended for both local and network computer systems.

Figure 2:
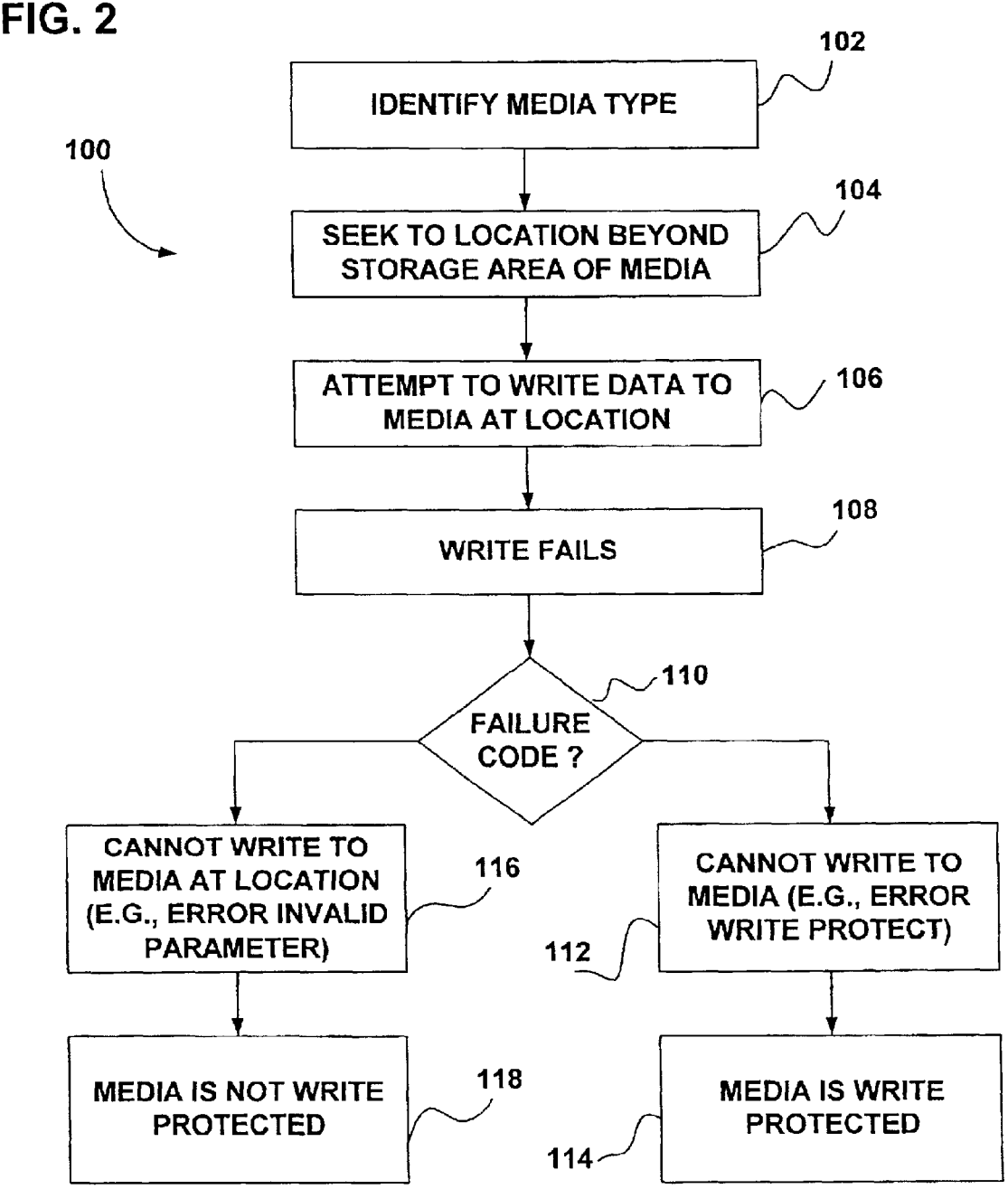
FIGS. 2 and 3 are flow charts illustrating exemplary processes for identifying the write protect status of a media.
Figure 3:
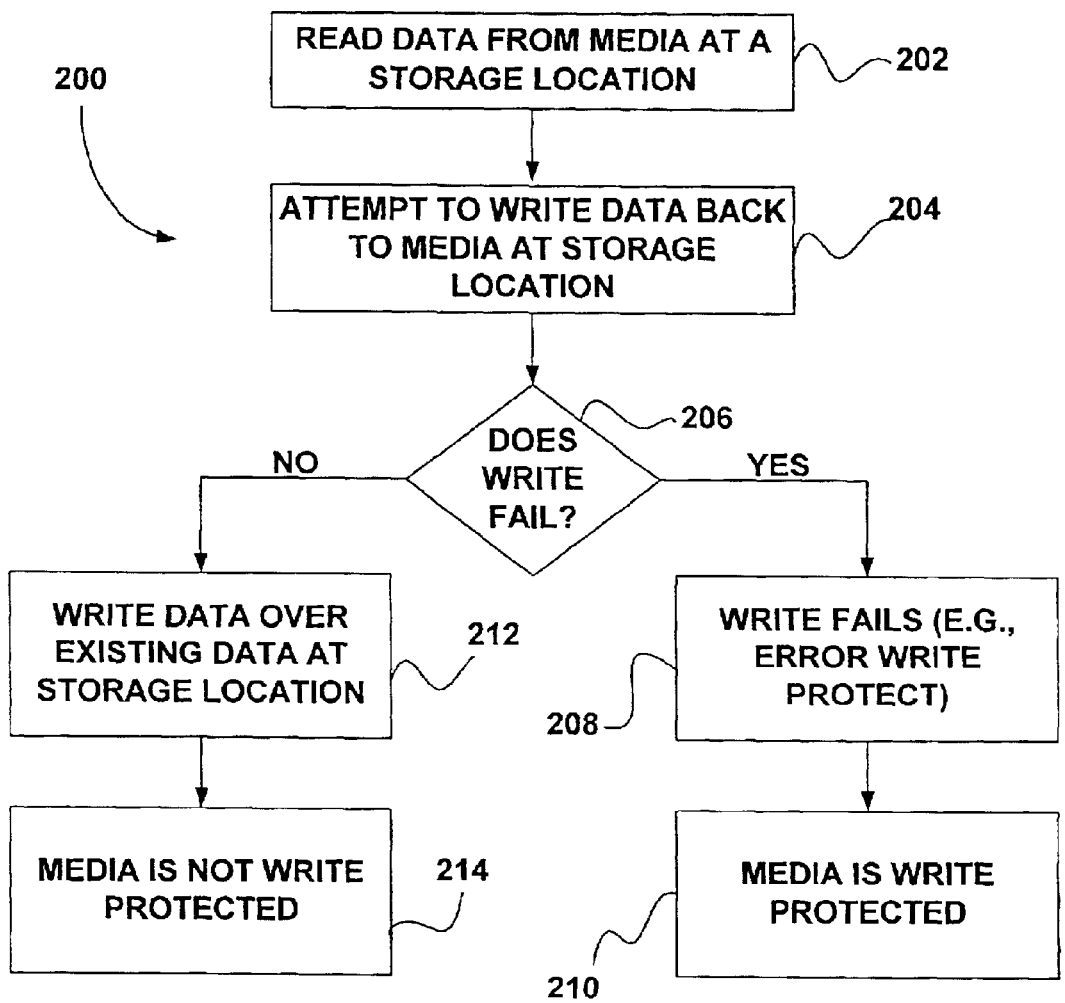

FIGS. 2 and 3 are flow charts illustrating exemplary processes 100 and 200 for identifying the write protect status of the removable media 28. Processes 100 and 200 may be performed at any time by the host computer system or a remote computer system, such as discussed above with reference to FIG. 1. For example, the host or remote computer systems may initiate processes 100 or 200 upon insertion of the removable media 28 into the media drive 26, upon an access request by the host or remote computer system, or at any other suitable time.

As illustrated in FIG. 2, the process 100 proceeds to identify the write protect status by identifying the media type of the removable media 28 (block 102), seeking to a location beyond the storage area of the removable media 28 (block 104), and then attempting to write data to the removable media 28 at the location (block 106). For example, the process 100 may identify the removable media 28 as a floppy diskette (e.g., a 3-½ inch computer diskette) and seek past the end of storage tracks and sectors to a non-storage location in which data cannot be stored on the removable media 28. Accordingly, the attempt by process 100 to write data to the removable media 28 at the non-storage location fails, as expected (block 108). The process 100 then identifies the write protect status of the removable media 28 by evaluating the failure code generated by the attempted write to the non-storage location (block 110). For example, the process 100 may cause a failure code, such as ERROR_WRITE_PROTECT, which indicates that 20 data cannot be written to the removable media 28 (block 112). If the attempted write at block 106 produces the foregoing failure code at block 112, then the process 100 identifies the write protect status of the removable media 28 as write protected (block 114). However, the process 100 also may fail by another failure code, such as ERROR_INVALID_PARAMETER, which may indicate that data cannot be written to the removable media 28 at the non-storage location (block 116). If the attempted write at block 106 produces the foregoing failure code at block 116, then the process 100 identifies the write protect status of the removable media 28 as not write protected (block 118). However, in either case, data is not written to the removable media 28.

As illustrated in FIG. 3, the present technique may interact with the removable media 28 in any suitable manner that produces one or more error codes, which may be used to identify the write protect status of the media 28. Process 200 proceeds to identify the write protect status by reading data from the removable media 28 at a storage location (block 202), attempting to write the data back to the removable media 28 at the same storage location (block 204), and then querying whether the attempted write has failed (block 206). If the attempted write fails, then the process 200 observes a write failure code, such as ERROR_WRITE_PROTECT (block 208). The process 200 then evaluates the write failure code observed at block 208 and identifies the write protect status of the removable media 28 as write protected (block 210). However, if the attempted write does not fail, then the process 200 proceeds to write the data over the existing data at the storage location (block 212). Accordingly, the process 200 evaluates the successful write at block 212 and identifies the write protect status of the removable media 28 as not write protected (block 214).

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims. For example, the systems and methods described above may be performed locally or remotely by any suitable computer hardware and software, which may produce a variety of failure codes that may be utilized by the present technique to identify the write protect status of the removable media. Moreover, the present technique may provide custom failure codes associated with a write protect identification program, which may be disposed on a host or remote computer system.

What is claimed is:

1. A method of identifying a write protect status of a floppy disk, comprising the acts of:
    seeking to a location beyond storage tracks and sectors of a storage area of the floppy disk, wherein data cannot be stored at the location;
    attempting to write data to the floppy disk at the location;
    evaluating a failure code produced by the attempted write; and
    identifying the write protect status of the floppy disk based on the failure code.

2. The method of claim 1, comprising the act of identifying a media type of the floppy disk.

3. The method of claim 2, wherein the act of identifying the media type comprises the act of identifying a storage range of the floppy disk.

4. The method of claim 1, wherein the acts of seeking, attempting to write data, evaluating the failure code, and identifying the write protect status are initiated automatically upon insertion of the floppy disk into a floppy disk drive.

5. The method of claim 1, wherein the acts of seeking, attempting to write data, evaluating the failure code, and identifying the write protect status are initiated by a remote computer.

6. The method of claim 5, comprising processing an access request from the remote computer for access to the floppy disk.

7. The method of claim 1, wherein the act of attempting to write data causes the failure code to be a write protect error if the write protect status of the floppy disk is write protected.

8. The method of claim 1, wherein the act of attempting to write data causes the failure code to be an invalid write error if the write protect status of the floppy disk is not write protected.

9. A method of identifying a write protect status of a computer diskette, comprising the acts of:
    reading data from the computer diskette at a storage location;
    attempting to write the data back to the computer diskette at the storage location; and
    identifying the write protect status of the computer diskette as write protected if a write protect error code is observed.

10. The method of claim 9, wherein the acts of reading data, attempting to write the data, and identifying the write protect status are initiated automatically upon insertion of the computer diskette into a computer disk drive.

11. The method of claim 9, wherein the acts of reading data, attempting to write the data, and identifying the write protect status are initiated by a remote computer.

12. The method of claim 11, comprising processing an access request from the remote computer for access to the computer diskette.

13. The method of claim 9, wherein the act of attempting to write the data causes the write protect failure code if the computer diskette is write protected.

14. The method of claim 9, wherein the act of attempting to write the data succeeds if the computer diskette is not write protected.

15. The method of claim 9, wherein the act of attempting to write the data comprises the act of attempting to rewrite the data over the data existing at the storage location.

* * * * *